(12) United States Patent (10) Patent No.: US 9,070,142 B2
Krone et al. (45) Date of Patent: Jun. 30, 2015

(54) ORDER FULFILLMENT SYSTEM AND METHOD FOR PRINTING PRODUCTS INCLUDING INDIVIDUALIZED INFORMATION

(71) Applicant: Taylor Corporation, North Mankato, MN (US)

(72) Inventors: Craig E. Krone, Mankato, MN (US); Scott S. Curry, Edina, MN (US); Ronald E. Hoffmeyer, Dana Point, CA (US)

(73) Assignee: TAYLOR CORPORATION, North Mankato, MN (US)

( * ) Notice: Subject to any disclaimer, the term of this patent is extended or adjusted under 35 U.S.C. 154(b) by 0 days.

(21) Appl. No.: 13/732,927

(22) Filed: Jan. 2, 2013

(65) Prior Publication Data

US 2013/0124334 A1 May 16, 2013

Related U.S. Application Data

(63) Continuation of application No. 11/612,121, filed on Dec. 18, 2006, now abandoned.

(60) Provisional application No. 60/835,952, filed on Aug. 7, 2006, provisional application No. 60/751,040, filed on Dec. 16, 2005.

(51) Int. Cl.
*G06F 15/00* (2006.01)
*G06F 1/00* (2006.01)
(Continued)

(52) U.S. Cl.
CPC ............ *G06Q 30/0269* (2013.01); *B42D 15/02* (2013.01); *G06K 15/024* (2013.01)

(58) Field of Classification Search
CPC .................... G06Q 30/0269; G06K 15/024

USPC ..................................... 705/14; 358/1.1–1.18
See application file for complete search history.

(56) References Cited

U.S. PATENT DOCUMENTS 1,567,406 A 12/1925 Wilke
3,524,782 A 8/1970 Buske
(Continued)

FOREIGN PATENT DOCUMENTS

GB 2242162 9/1991
JP 2001344362 12/2001
(Continued)

OTHER PUBLICATIONS

Bill Bradway, Financial Insights, *Transforming Branch Banking: Real-Time Advice in the 21st Century*; pp. 1-14, © 2005.
(Continued)

*Primary Examiner* — Douglas Tran
(74) *Attorney, Agent, or Firm* — Patterson Thuente Pedersen, P.A.

(57) ABSTRACT

Interactive custom printed order placement and fulfillment systems and methods for placing, selling, accepting, proofing, transmitting, producing, servicing, and delivering orders for printed products including individualized or personalized information in time-efficient ways. Video conferencing technicians can provide direct access to professional, expert, and knowledgeable help. The interactive custom printed order fulfillment systems and methods further provide opportunities for targeted up-sells, cross-promotion, advertising, marketing, and information management to benefit those placing orders, those facilitating or brokering orders, and those producing and delivering orders, thereby increasing information efficiency.

16 Claims, 9 Drawing Sheets

(51) Int. Cl.
  *G06K 1/00*   (2006.01)
  *G06K 15/00*  (2006.01)
  *G06Q 30/02*  (2012.01)
  *B42D 15/02*  (2006.01)
  *G06K 15/02*  (2006.01)

(56) References Cited

U.S. PATENT DOCUMENTS

| | | |
|---|---|---|
| 4,589,590 A | 5/1986 | McGuire |
| 4,967,496 A | 11/1990 | Kyler |
| 5,389,414 A | 2/1995 | Popat |
| 5,646,389 A | 7/1997 | Bravman |
| 5,699,526 A | 12/1997 | Siefert |
| 5,732,229 A | 3/1998 | Dickinson |
| 5,790,664 A | 8/1998 | Coley et al. |
| 5,804,803 A | 9/1998 | Cragun et al. |
| 5,978,773 A | 11/1999 | Hudetz et al. |
| 5,991,876 A | 11/1999 | Johnson et al. |
| 6,332,146 B1 | 12/2001 | Jebens et al. |
| 6,334,631 B1 | 1/2002 | Hollander |
| 6,374,259 B1 | 4/2002 | Celik |
| 6,535,294 B1 | 3/2003 | Arledge, Jr. et al. |
| 6,615,234 B1 | 9/2003 | Adamske et al. |
| 6,618,808 B1 | 9/2003 | Johnson et al. |
| 6,633,311 B1 | 10/2003 | Douvikas et al. |
| 6,654,768 B2 | 11/2003 | Celik |
| 6,691,158 B1 | 2/2004 | Douvikas et al. |
| 6,722,574 B2 | 4/2004 | Skantze et al. |
| 6,758,391 B1 | 7/2004 | Pickens, III |
| 6,783,060 B2 | 8/2004 | Marappan |
| 6,795,922 B2 | 9/2004 | Johnson et al. |
| 6,883,000 B1 | 4/2005 | Gropper |
| 6,889,213 B1 | 5/2005 | Douvikas et al. |
| 6,920,567 B1 | 7/2005 | Doherty et al. |
| 6,992,794 B2 | 1/2006 | Keane et al. |
| 7,038,802 B2 | 5/2006 | Brady |
| 2002/0002543 A1 | 1/2002 | Spooren et al. |
| 2002/0022989 A1 | 2/2002 | Endo |
| 2002/0052933 A1 | 5/2002 | Leonhard et al. |
| 2002/0070963 A1 | 6/2002 | Odero et al. |
| 2002/0095368 A1 | 7/2002 | Tran |
| 2002/0138470 A1 | 9/2002 | Zhou |
| 2002/0138633 A1 | 9/2002 | Angwin et al. |
| 2003/0037010 A1 | 2/2003 | Schmelzer |
| 2003/0149623 A1 | 8/2003 | Chen |
| 2004/0000246 A1 | 1/2004 | Keane et al. |
| 2004/0010708 A1 | 1/2004 | Johnson et al. |
| 2004/0015408 A1 | 1/2004 | Rauen, IV et al. |
| 2004/0051730 A1 | 3/2004 | Douvikas et al. |
| 2004/0088259 A1 | 5/2004 | Celik |
| 2004/0093317 A1 | 5/2004 | Swan |
| 2004/0135364 A1 | 7/2004 | Dale |
| 2004/0181465 A1 | 9/2004 | Kan |
| 2004/0218218 A1 | 11/2004 | De Bie |
| 2004/0249653 A1 | 12/2004 | Le et al. |
| 2004/0249762 A1 | 12/2004 | Garibay et al. |
| 2005/0119975 A1 | 6/2005 | O'Donnell |
| 2005/0154737 A1 | 7/2005 | O'Donnell |
| 2005/0283411 A1 | 12/2005 | Rhea |
| 2006/0041484 A1 | 2/2006 | King et al. |
| 2006/0106725 A1 | 5/2006 | Finley, Jr. et al. |
| 2007/0075132 A1 * | 4/2007 | Kean .................... 235/380 |

FOREIGN PATENT DOCUMENTS

| | | |
|---|---|---|
| WO | WO 01/10653 | 2/2001 |
| WO | WO 0110653 A1 * | 2/2001 |
| WO | WO 01/80580 | 10/2001 |
| WO | WO 02/25403 | 3/2002 |
| WO | WO 02/46967 | 6/2002 |

OTHER PUBLICATIONS

Tandberg Architecture, *Tandberg Real-time Advisor: An architecture for bringing on-demand service Into the bank branch with higher ROI and customer satisfaction*, pp. 1-7, undated.

Tandberg Solutions, Real-time Advisor, pp. 1-3, undated.

What's new with ecardfile.com? (https://ecardfile.com/hpic/ecf/jsp/Message?title=help&text=Information.txt(2004), 2 pages, as available on Jul. 13, 2005.

Shore, Data Depth's iCopyright Plugin Aims to Make Licensing Awareness and Compliance Easy, dated Oct. 4, 2004, as available at http://www.shore.com/commentary/weblogs/2004/10/data-depths-icopyright-plugin-aims-to.html.

Gistics, *Business Case for On-Demand Delivery of Digital Asset Management in Global Marketing Operations* © 2005, 39 pages.

Application and File History for U.S. Appl. No. 11/612,121, filed Dec. 18, 2006, Inventors: Krone et al.

\* cited by examiner

ORDER FULFILLMENT SYSTEM AND METHOD FOR PRINTING PRODUCTS INCLUDING INDIVIDUALIZED INFORMATION

RELATED APPLICATIONS

This application is a continuation of application Ser. No. 11/612,121 filed Dec. 18, 2006, which claims the benefit of U.S. Provisional Application No. 60/835,952 entitled "ORDER FULFILLMENT SYSTEM AND METHOD FOR PRINTING PRODUCTS INCLUDING INDIVIDUALIZED INFORMATION," filed Aug. 7, 2006, and to U.S. Provisional Application No. 60/751,040 entitled "DIGITAL MARK ASSET MANAGEMENT SYSTEM AND METHOD," filed Dec. 16, 2005; and is related to U.S. application Ser. No. 10/942,747 entitled "DIGITAL CONTENT LICENSING TOOLBAR," filed Sep. 16, 2004; U.S. application Ser. No. 11/242,603 entitled "SYSTEM AND METHOD FOR ELECTRONICALLY MANAGING INDIVIDUAL AND BUSINESS INFORMATION," filed Oct. 3, 2005; and U.S. application Ser. No. 11/301,501 entitled "PACKAGING, STORING AND DISPENSING SYSTEM FOR PRINTED MATERIALS," filed Dec. 13, 2005, all of which are incorporated herein by reference.

FIELD OF THE INVENTION

The invention relates generally to custom printed or other products, such as business cards, that include individualized consumer or business information. More particularly, the invention relates to systems and methods for accepting, creating, marketing, and handling orders for custom printed or other products that include individualized consumer or business information.

BACKGROUND OF THE INVENTION

The commercial printing industry has developed and modernized with the primary goal of efficiently and accurately producing uniformly printed and high quality goods, often in large runs. Newspapers, for example, are printed daily in runs of thousands or millions in a matter of mere hours. Printing equipment, order handling, and general infrastructure, from placement to delivery, have therefore been designed to most effectively handle these types of orders.

By contrast, individualized printed goods including customized or personalized information and graphics are typically printed in smaller runs. Individualized printed goods can include paper products such as business cards, letterhead, invitations, calendars, and announcements, as well as a diverse range of other goods including apparel, bags, banners, signs, glassware, mugs, cups, bottles, pens, pencils, trophies, statuettes, sporting goods and equipment, magnets, tags, labels, mailers, packaging materials, digital and computer products, and other items that include personal, corporate, or other customized or personalized data, graphics, logos, colors, schemes, or information. As such, the term "printing" is broadly and generally used herein to refer to a variety of manufacturing, production, reproduction, and creation systems and methodologies.

Individualized printed goods are important personal and professional communication tools on which businesses and individuals rely to accurately and effectively provide information, project an image, advertise or market ideas and events, and encourage more personal communicative contact in increasingly impersonal and isolated digital environments. For example, despite the availability and convenience of digital transmission and communication technologies, hardcopy business cards remain relevant and effective business communication tools. Because individualized goods are more personal and can be targeted and customized for particular uses, relatively smaller runs are often produced to meet varying specific needs. A wedding invitation order might include two hundred announcements and reply cards. Business cards are often printed in orders comprising 250 to 1,000 or more individual cards. Hats or T-shirts can be printed for particular events, such as an annual 5K race or a family reunion. Magnets and plastic cups can be produced monthly, seasonally, or annually to include a particular team's schedule.

While the commercial printing industry can print quality individualized printed goods, the current infrastructure is not sufficiently nimble so as to quickly produce single short-run orders at a low cost. For example, set-up, design, and other fees often make it more cost effective on a per-item basis to order 1,000 customized T-shirts instead of only ten. In some instances, the printing system can make the production of smaller orders more efficient from a manufacturing and processing perspective by holding multiple single short-run orders to form a single larger run order. Multiple business card orders, for example, can be held until enough are received to fill out a single printing run, which is often preferred in some circumstances to reduce operational stresses on printing press systems.

The result, from the printer's perspective, is an efficient use of printing resources. From a consumer's perspective, however, the result can be an extended wait time for individualized printed products rather than a desired quick turnaround. In the above business card example, the consumer submitting the first order of a larger run of orders may experience a delay of several days to several weeks before their order is even printed, much less packaged, shipped, and delivered, given the practice of holding multiple individual orders for larger runs. In addition to being delayed, the wait period can also be uneven between different consumers, depending upon whether a consumer's order is one of the first or last received in a single large run.

Unfortunately, balancing the needs of commercial printers with those of individual consumers is not easily accomplished. While some printing companies may have equipment designed more exclusively for short-run jobs, this equipment is often more costly and less efficient than that used for larger run commercial print jobs. The options available when using such equipment also may be reduced. For example, only certain types of papers and stocks may be compatible or ink color palettes limited because use is reduced.

Even if equipment is developed to handle short-run orders and produce a high quality product, the order handling infrastructure becomes a limiting factor in the order time. Orders are often submitted to printing companies in hardcopy form. After the order is received by the printing company in the mail, as a facsimile document, or in some other form from an individual or dealer, the order must be manually entered and sometimes reentered into the printing system. A first entry may be needed for a printing company's billing system and a second separate entry for typesetting and actual printing. Multiple entries present multiple opportunities for typographical and other errors; the data enterer or typesetter may miss errors made by the consumer on the order form, may introduce new errors or inaccuracies when manually entering the order, and then may not catch these errors and inaccuracies when proofing the order they themselves entered.

In addition to being time-inefficient with respect to small-run orders, the existing commercial printing industry can also be information inefficient from both consumer and printer perspectives. To place a custom order according to some conventional practices, an individual consumer visits an office supply store, print shop, dealer, or other retailer to peruse available custom printing options available from a printing company. The retailer is typically a third party to the transaction between the consumer and the printing company, not formally affiliated with the printing company yet able to accept orders for the printing company's products in exchange for a commission or other fee. An individual may also submit an order directly to or through the printing company, such as through a catalog or other ordering system, without involving a third-party retailer. In one example relating to business cards, the consumer may be able to select card stock, colors, fonts, and graphics from one or more sample books provided by the retailer. The selections are generally made in isolation without providing the consumer with the opportunity to view the selections in combination. For example, other than holding cardstock and ink color sample charts near each other, the consumer may not be able to see what a selected ink color actually looks like when printed on a chosen cardstock. Further, certain printing or finishing effects offered may not be viewable in catalogs or may not always be provided in sample books.

After the aforementioned selections are made, the consumer will typically fill in desired custom content to be printed on the business card, such as name and contact information, on a hardcopy order form. The consumer's desired content must conform to the options provided by the hardcopy order form, with little or no opportunity for advanced custom layouts or other higher-level design features. The result is an order for a "custom" printed product that may not be fully customized as desired by the consumer because of information access constraints imposed by the hardcopy order submission process.

Further, the consumer may never have had an opportunity to view a complete mock-up or proof of their selections and therefore may not be entirely confident in the combined result of the various separate selections. Alternatively, if proofs are available, they may have to be mailed to the consumer for review, further delaying the overall order turnaround time and adding additional postage, delivery, and processing expenses. If electronic proofs can be provided, they still may not adequately display and convey colors. Therefore, existing order processes are information inefficient to consumers because consumers are provided with incomplete information during their design and decision-making process.

At times during the above process, the consumer might need or want assistance in making selections or clarifying options and may have specific questions relating to the mechanics of the ordering process. The only assistance available, however, may be the retailer's employees, who may be less familiar with the ordering process and multitude of options and who likely do not have specialized training in graphic layout and design. As mentioned above, the retailer is typically a third party to the transaction. Therefore, the retailer's employees may have limited training in and experience with the printing company's branding and product lines in order to offer related products that may be of use to the individual, depending on how long they have been with the retailer and how much training they received. Further, the retailer typically incurs the costs of and invests time in training each employee with respect to accepting and placing orders. These costs and times can become significant if multiple new employees are hired or if turnover occurs. Other retailers may have little motivation or interest in accepting or handling more complex orders. For example, a consumer ordering business cards may also need letterhead, envelopes, and announcement cards, or have use for business marketing products such as pens, folios, labels, and other items that include personalized printed content, so-called "up-selling" or cross-promotion. In the current custom printing order process, however, there is little or no opportunity for the printing company to directly offer these other products to the consumer. The consumer may also be interested in other products or services offered by the retailer, the printing company, or other organizations related to or somehow affiliated with either of these organizations. These other organizations, however, do not have a way of contacting the consumer to inform them of additional opportunities.

Further, as a simple matter of course, the printing company collects a significant amount of valuable information about the consumer placing the order, such as the consumer's contact information, job title, business or employer, order placement retailer, and location. With the exception of using the information to print and deliver the desired product, the information is not used to the benefit of any of the consumer, the retailer, or the printing company. Further, most retailers are not able to store the information, which may include logos, artwork, and specific print requirements, for future use. If a consumer decides to add items after an initial order is placed or desires to reorder later in the time, the entire order process may need to be repeated, including the gathering and transmission of basic information, in part or in its entirety. These information inefficiencies are experienced by both the consumer, who has limited access to available options, and the commercial printer, who may not be effectively meeting the needs of the consumer. These inefficiencies can also lead to product inconsistencies. For example, if a consumer wants to reorder business cards including a specialized logo a year after a first order and wants the reordered product to be identical to that of the first order, the consumer typically will have to resubmit the logo or other digital mark asset to the retailer or printing company because the original logo was not captured and stored for reuse either in hardcopy or digital form.

After the hardcopy order form is completed to the best of the consumer's ability, the retailer forwards the hardcopy form to the printing company, typically in the mail or by fax. Once received by the printing company, the order must be interpreted by a printing company employee and manually entered into the printing company's system as described above. If an order simply cannot be read or understood because of poor handwriting, incomplete data, or reduced document quality, the order is placed on hold and the hardcopy form is return mailed or faxed to the consumer placing the order or to the retailer where the order was placed. The consumer also can be contacted for clarification. Whether the form is returned or the consumer contacted, additional expense and inefficiency are introduced into the ordering process.

Inefficiencies are also introduced by existing order packaging and distribution systems. Commonly, after printing, the business cards are packaged into cardboard boxes and shipped or delivered. Current methods of packaging of business cards require that the business cards be packaged largely by hand, and that the lid to the business card box, as well as a sample card on the exterior of the box for identification of the contents, be applied manually. The process of actually printing business cards is largely accomplished by automation and can be done with high speed commercial grade printing machinery, albeit with the deficiencies described above. The requirement for manual packaging of the business cards at the end of the process dramatically limits the speed with which cards can be packaged and shipped. Further, when printing large run orders, each product is the same, making packaging and shipment a matter of matching the correct number of products to be sent to a particular recipient. In smaller run orders, particularly in batches of small runs held to form a single large run, order mix-ups can more easily occur, such as shipping the sixtieth order in a batch of one hundred to the address of the sixty-first order, particularly when orders are manually handled as described above. Order handling errors can also occur if a typographical error was introduced at the time of order placement or during the aforementioned manual order entry.

When the consumer ultimately receives their order, which may be one to several weeks after the order was initially placed, the consumer may notice errors or inaccuracies in the printed product. The error(s) may be significant enough to require reproduction of the entire order, or they may be minor enough that the consumer accepts the order as-is. In either event, the consumer may be reluctant to reorder from the same retailer (and, therefore, from the same printing company) in the future given the extended turnaround and disappointing result.

Conventional ordering and delivery systems for products including individualized, customized, or personalized information are therefore inefficient from both time and information perspectives and do not provide branding, marketing, and proofing opportunities in convenient ways. Therefore, a need remains in the industry for improved order placement and delivery systems for short-run individualized printed products.

SUMMARY OF THE INVENTION

The present invention resolves many of the above-described deficiencies and drawbacks inherent with existing printing systems by providing interactive custom printed order fulfillment systems and methods for selling, accepting, proofing, transmitting, producing, servicing, and delivering orders for printed products including individualized, customized, or personalized information in time-efficient ways. For example, embodiments of the present invention can significantly reduce the turnaround time for a customized business card order. The interactive custom printed order fulfillment systems and methods further provide opportunities for targeted up-sells, cross-promotion, advertising, marketing, and information management, which can benefit all parties involved in the order fulfillment system.

The above summary of the invention is not intended to describe each illustrated embodiment or every implementation of the present invention. The figures and the detailed description that follow more particularly exemplify these embodiments.

DETAILED DESCRIPTION OF THE DRAWINGS

While one particular example relating to printed business cards will be described herein, the interactive order fulfillment systems and methods of the present invention contemplate much wider applicability. For example, the systems and methods can be used to fulfill orders for one or more products generally printed on paper and other similar materials, such as business cards, letterhead, invitations, calendars, cards, mailers, folios, tags, labels, envelopes, and announcements, as well as a diverse range of other products and goods including apparel, bags, banners, signs, glassware, mugs, cups, bottles, pens, pencils, trophies, statuettes, sporting goods and equipment, magnets, packaging materials, digital audio and video/visual computer products, and other items that include personal, corporate, or other customized or personalized data, graphics, logos, colors, schemes, or information. As such, "printing" can broadly include more traditional paper and ink press systems as well as screening, etching, embroidering, stitching, transferring, bonding, heat applying, copying, and other creation, transmission, and reproduction techniques and methodologies.

The invention improves the efficiency of ordering systems, from selection, transmission, manufacturing, and delivery, and enhances information use and exchange by viewing information previously used only for basic ordering tasks and manufacturing imaging as data. The data and various assigned metadata tags enable wider use of the information to the benefit of consumers, retailers/brokers, and printers/manufacturers. For example, contact information provided by a consumer to be printed on an individualized product can be used to concurrently provide targeted marketing, offer a catalog or display of pre-populated complementary products, and manage orders, all to the benefit and for the convenience of the consumer. The same information can be used in real time to more effectively merchandise, advertise, market, and customize information provided to the same and similar consumers by retailers and others brokering the individualized product order. Additionally, the information can be stored and managed by the manufacturer, to be used for more efficient order and reorder fulfillment and handling, product development, and retailing. The information can also benefit any or all of the consumer, retailer/broker, and manufacturer if the information is shared with commonly interested but unrelated parties offering goods and services.

Figure 1:
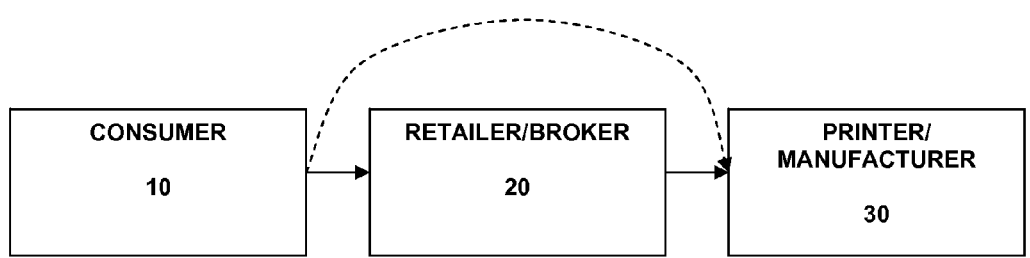
FIG. 1 is a participant block diagram according to one embodiment of the invention.

Referring to FIG. 1, one embodiment of the invention facilitates transactions and interactions between a consumer 10, a retailer/broker 20, and a printer/manufacturer 30. Consumer 10 can be an individual, a small business, a corporation, or any other entity desiring to order custom printed or created products. Retailer/broker 20 can be a small- or large-scale retailer, public or private organization, or virtually any entity willing to or capable of communicating with consumer 10 and printer/manufacturer 30. Retailer/broker 20 may be motivated by a commercial or contractual relationship with printer/manufacturer 30 or may broker communications between consumer 10 and printer/manufacturer 30 as a complimentary service to consumer 10. Retailer/broker 20 can also be part of or directly related to printer/manufacturer 30.

In one embodiment, retailer/broker 20 is a big box retailer, an office supply store, a specialty retailer, a convention center hosting a communications kiosk, or some other entity. In another embodiment, consumer 10 can directly communicate and interact with printer/manufacturer 30. Printer/manufacturer 30 can be a small- or large-scale commercial printer, manufacturer, or other producer or provider of goods and services. For example, printer/manufacturer 30 can print paper products, produce apparel, manufacture plastics or glassware, provide commercial advertising goods, and the like. In one non-limiting example described herein throughout, consumer 10 is generally a business or individual, retailer/broker 20 is a retail store, and printer/manufacturer 30 is a commercial printing company.

Figure 2:
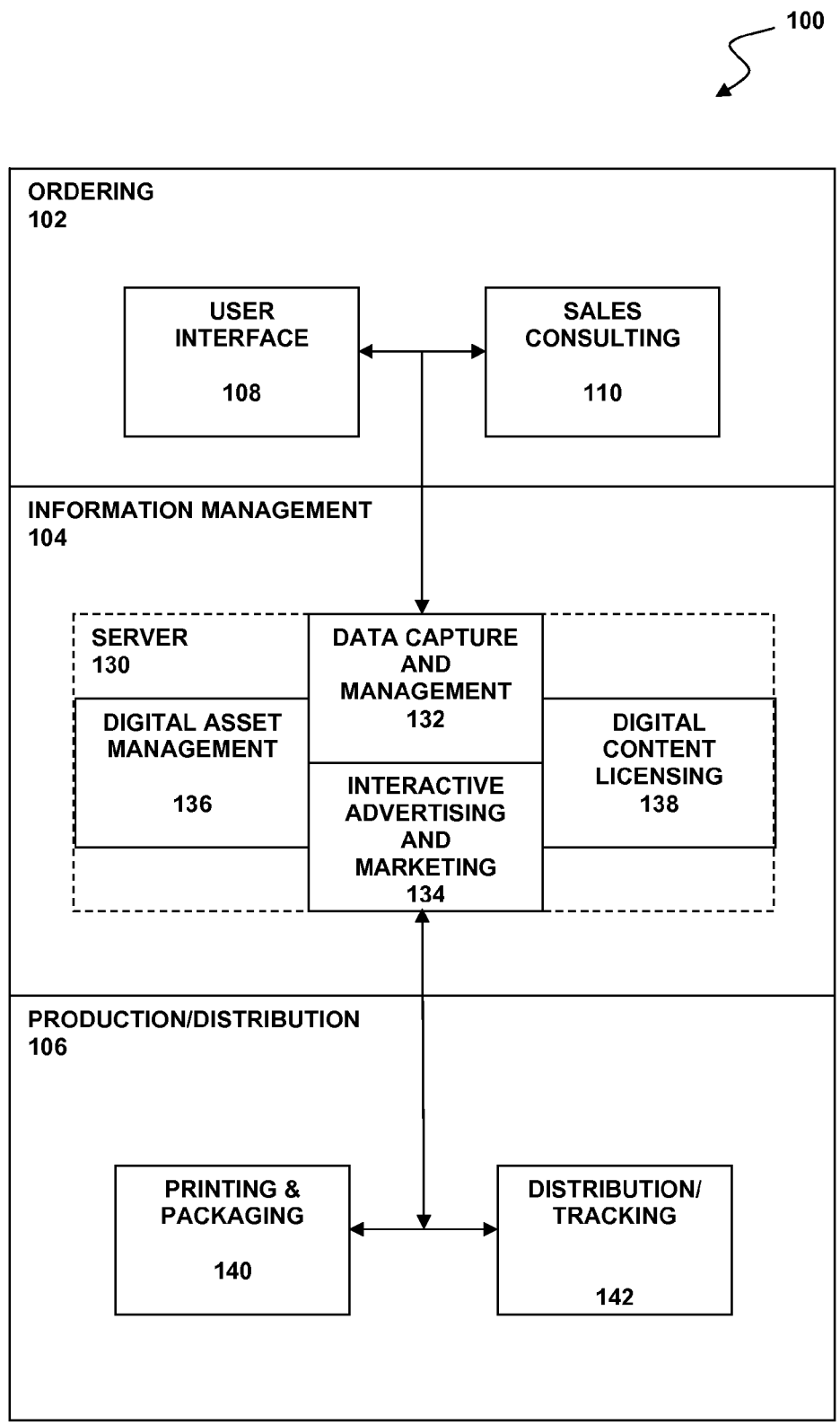
FIG. 2 is a block diagram of a system according to one embodiment of the invention.

Referring to FIG. 2, one embodiment of an interactive custom printed order fulfillment system 100 accessible at various levels as described in more detail herein throughout by each of consumer 10, retailer/broker 20, and printer/manufacturer 30 according to the invention comprises three primary subsystems: an ordering subsystem 102, an information management subsystem 104, and a production/distribution subsystem 106. Although integrated within system 100 in one embodiment, each subsystem 102, 104, 106 can be partially or fully applicable to other systems or can comprises standalone components or features.

Ordering subsystem 102 comprises a user interface 108 and a sales consulting component 110 in one embodiment and can be accessed by consumer 10 or retailer/broker 20 to place an order, manage an account, or otherwise provide or edit information. User interface 108 can comprise a standalone personal computer coupled to a communications network, such as the Internet or another partially or fully wired or wireless network. Ordering subsystem 102 preferably comprises a plurality of user interfaces 108, with each individual user interface 108 communicatively coupled to the Internet, an Intranet system, or some other public or private, wired or wireless, communication network to provide two-way communications with subsystems 104 and 106.

Figure 3:
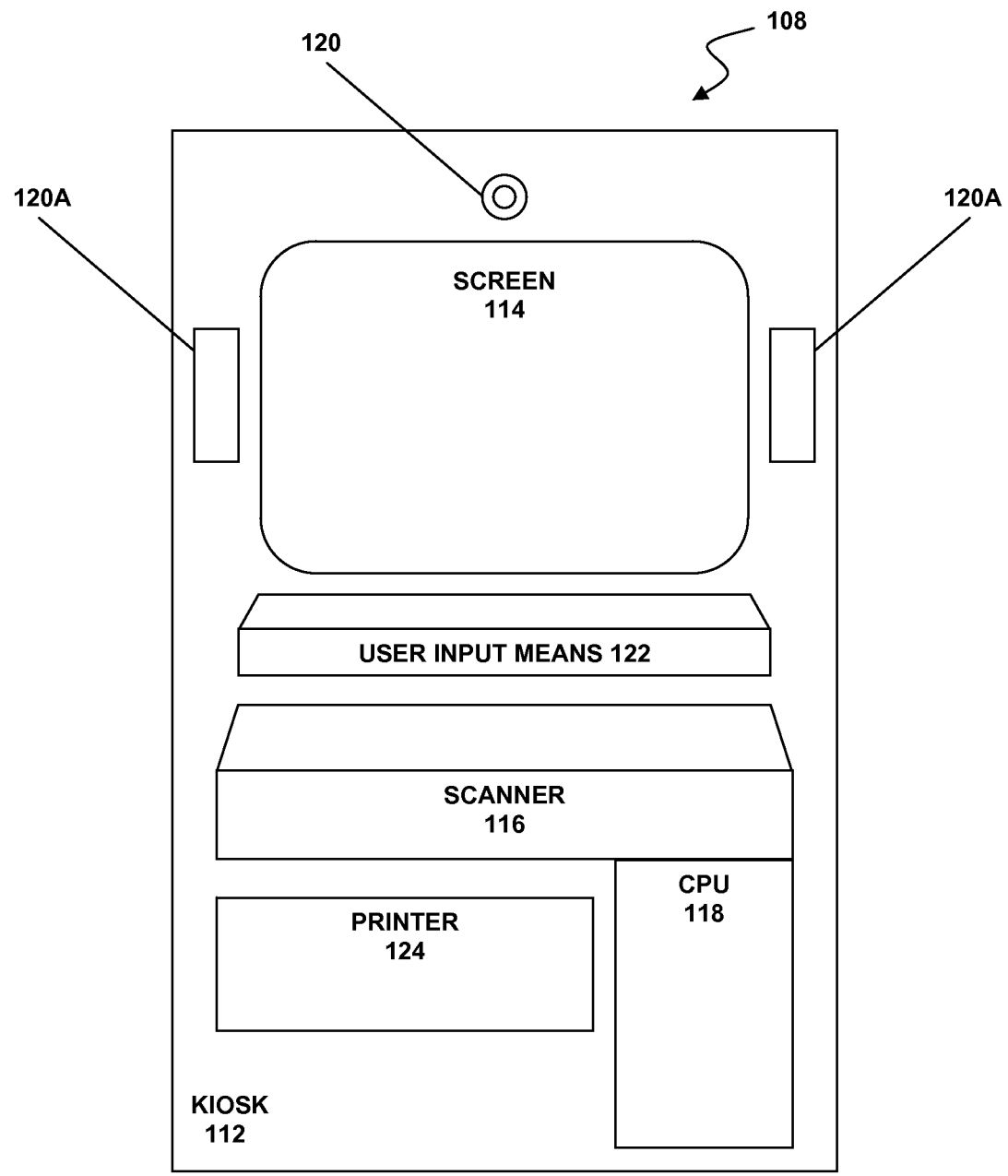
FIG. 3 is a block diagram of a kiosk system according to one embodiment of the invention.

Referring also to FIG. 3, user interface 108 comprises one or more dedicated computer kiosk systems 112 communicatively coupled by the Internet or some other partially or fully wired or wireless network to information management subsystem 104 in one embodiment. Kiosk system 112 can be hosted, for example, by retailer/broker 20 for access by consumer 10, as described in more detail below. In other embodiments, user interface 108 comprises or operates on a wired or wireless handheld device. The handheld device may be a standalone device or may operatively couple to, for example, kiosk system 112. Such communicative coupling can comprise a USB, Bluetooth, infrared, radio frequency, proprietary docking, or wired or wireless other connection.

As depicted in FIG. 3, kiosk 112 comprises a screen 114, a scanner 116, a central processing unit (CPU) 118, and an optional camera and microphone unit 120. Kiosk 112 also comprises user input means 122, such as one or more of a keyboard, touchpad, mouse, trackball, joystick, infrared sensor, USB or other communications port, Bluetooth communications circuitry, and docking station, and an optional printer 124. Kiosk 112 may be embodied in other forms in other embodiments of the invention. The particular configuration of kiosk 112 is of less significance than the user interface functions and features provided. For example, screen 114, scanner 116, camera 120, user input means 122, and printer 124 may be located together, while CPU 118 is located nearby but not within the same immediate geographic area in one embodiment. Alternatively, CPU 118 may be omitted, replaced by or supplemented with a local or remote server or server connection in other embodiments.

Screen 114 can comprise any suitable monitor or display unit, such as a cathode ray tube (CRT) display, liquid crystal display (LCD) screen, plasma screen, and touch screen. Screen 114 can comprise a single screen or monitor unit or a plurality of individual screens. For example, screen 114 can comprise a first data screen and a second video screen positioned adjacent each other in kiosk 112 in one embodiment. In another embodiment, data and video are presented on a single split screen. Virtually any single or multi-screen arrangement may be used.

Scanner 116 comprises a standalone or integrated hardcopy digital scanning unit communicatively coupled to CPU 118, screen 114, and/or the Internet or other wired or wireless communications network to which kiosk 112 is coupled. In one embodiment, scanner 116 is adapted to scan an existing paper image, such as a business card, letterhead document, or other item. The scanned image is then recreated in a digital format. This recreation can be carried out by scanner 116 itself, or in part or wholly by CPU 118 and/or another component of system 100, as described in more detail below.

CPU 118 can comprise any of a desktop, tower, notebook, component, or other computer device adapted at least in part to facilitate communications between kiosk 112 and other components of system 100. As mentioned above, CPU 118 may be omitted, replaced by or supplemented with a local or remote server or server connection in other embodiments. CPU 118 can comprise proprietary local software adapted to interface with scanner 116 and system 100. In other embodiments, CPU 118 is primarily adapted to communicatively couple kiosk 112 with other components of system 100, the other components including proprietary and non-proprietary software as described in more detail below. In one embodiment, CPU 118 comprises an Internet browser and communications software and hardware to facilitate user interaction with kiosk 112.

Camera and microphone unit 120 can comprise a one- or two-way camera unit and a microphone and speaker in one embodiment. The microphone and speaker can be integrated with or distinct from camera unit 120. For example, the microphone may be positioned to best pick up consumer 10's speech, while the speaker is positioned where consumer 10 can most conveniently hear sound while limiting the sound to the immediate area of kiosk 110. In one embodiment, the speaker is integrated with CPU 118. In another embodiment, kiosk 112 is outfitted with one or more individual speakers 120A. Camera unit 120 is adapted to provide enhanced communications between kiosk 110 and, in particular, sales consulting component 108. Sales consulting component 108 is described in more detail below.

If scanner 116 is not available, not preferred by consumer 10, or omitted from kiosk 112, consumer 10 can enter new or updated data into user interface fields, or data from an existing paper image, via user input means 122. As previously mentioned, user input means 122 can comprise one or more of a keyboard, touchpad, mouse, trackball, joystick, voice recognition system, infrared sensor, USB or other communications port, Bluetooth communications circuitry, docking station and the like. User input means 122 can also be partially or wholly integrated with any of screen 114, scanner 116, and CPU 118. For example, screen 114 can be a touch screen and/or CPU 118 can comprise a notebook computer with integrated keyboard and touchpad mouse. Even if not specifically used to replace or supplement scanner 116, user input means 122 are preferably included as part of kiosk 112 to enable manual user entry of account numbers and other preliminary information or information not capable of being gleaned from an existing hardcopy business card, other paper image, or digital communication.

Optional printer 124 can comprise an ink jet, laser, or other printing device to provide hardcopy printouts of proofs, order forms, order confirmations, and other materials. Printer 124 can be located at kiosk 112 as depicted or in another location. For example, in an embodiment in which kiosk 112 is located at retailer/broker 20, optional printer 124 can be located in a secure location, such as at a service desk. Multiple kiosks 112 can share a single printer 124 in other embodiments.

In one embodiment, kiosk 112 is adapted for placement at retailer/broker 20, which can be virtually any relatively secure public or private location, such as in an office supply, general merchandise, home improvement, retail, wholesale, or other store, or in a mall, airport, library, government center, educational institution, post office, bank, corporate building, convention center, medical facility, pedestrian area, or other interior or exterior location. In such an embodiment, kiosk 112 is communicatively coupled to the Internet, an Intranet system, a local or remote server, or some other open or dedicated communications network for exchanging data and information in real time. The particular communications network and connections can be land-line, wireless, or a combination thereof. In accordance with at least one embodiment discussed above, and to more easily facilitate placement of a streamlined and attractive kiosk 112 in a retail location, CPU 118 may be located in a secure location separate from screen 114 and other components of kiosk 112 or may comprise a server connection. In other embodiments, CPU 118 is omitted, and kiosk 112 comprises a terminal unit communicatively coupled to a local or remote server or to the Internet.

Referring again to FIG. 2, user interface 108 is communicatively coupled to sales consulting component 110 in one embodiment. Sales consulting component 110 and camera unit 120 are adapted to provide a live, real-time audio and video link between consumer 10 at kiosk 112 (or, more generally, user interface 108) and a trained sales and service consultant at a remote sales and customer service location 110. Using the same kiosk 112 set-up but differently connected with data and production systems, the Internet-enabled communicative connection between kiosk 112 and sales consulting component 110 provides convenient assistive, marketing, and branding opportunities during the ordering of custom printed items by consumer 10. The communicative connection can be dedicated or on-demand and can be one-way or two-way.

Sales consulting component 110 operates in cooperation with camera unit 120 of kiosk 112 in one embodiment. In another embodiment, video, audio, and text are provided to consumer 10 of kiosk 112, while only audio is provided by kiosk 112 to sales consulting component 110 to increase consumer 10's comfort by eliminating the appearance of consumer 10 on camera. In yet another embodiment, video provided by camera unit 120 at kiosk 112 is a user selectable option, enabling consumer 10 to be seen via video if consumer 10 so consents. In further embodiments in which camera unit 120 is unavailable or not desired, sales consulting component 110 and user interface 108 can be voice only, text and graphics e-mail, messaging, or live chat only, or some combination thereof. Technologies which may be implemented at kiosk 112 and/or as part of sales consulting component 110 to support video and voice communications and text messaging include Microsoft RTC API 1.2, TIGHTVNC, remote frame buffering, Windows C#, and other computer and web technologies.

User interface 108 and sales consulting unit 110 of ordering subsystem 102 interface with information management subsystem 104. Information management subsystem 104 comprises a server 130. Server 130 can comprise a single or multi-unit configuration and can be locally or geographically distributed for efficient information management and for security and information backup and redundancy. Server 130 operably stores, secures, and distributes customer and other data from ordering subsystem 102. As such, server 130 is a general repository for and manager of user account information as scanned or input into kiosk 112. Server 130 further comprises proprietary hardware and software packages adapted to facilitate various features of system 100. In one embodiment, server 130 comprises a data capture and management application 132, an interactive advertising and marketing application 134, a digital asset management application 136, and a digital content licensing application 138. Each of these applications can be implemented by server 130, by individual servers comprising server 130, or by some other server engine, hardware, software, firmware, or computer configuration as understood by one skilled in the art. Regardless of the particular configuration in any one embodiment, each part and portion of server 130, including applications 132, 134, 136, and 138 can share data in efficient and non-duplicative ways.

Figure 4:
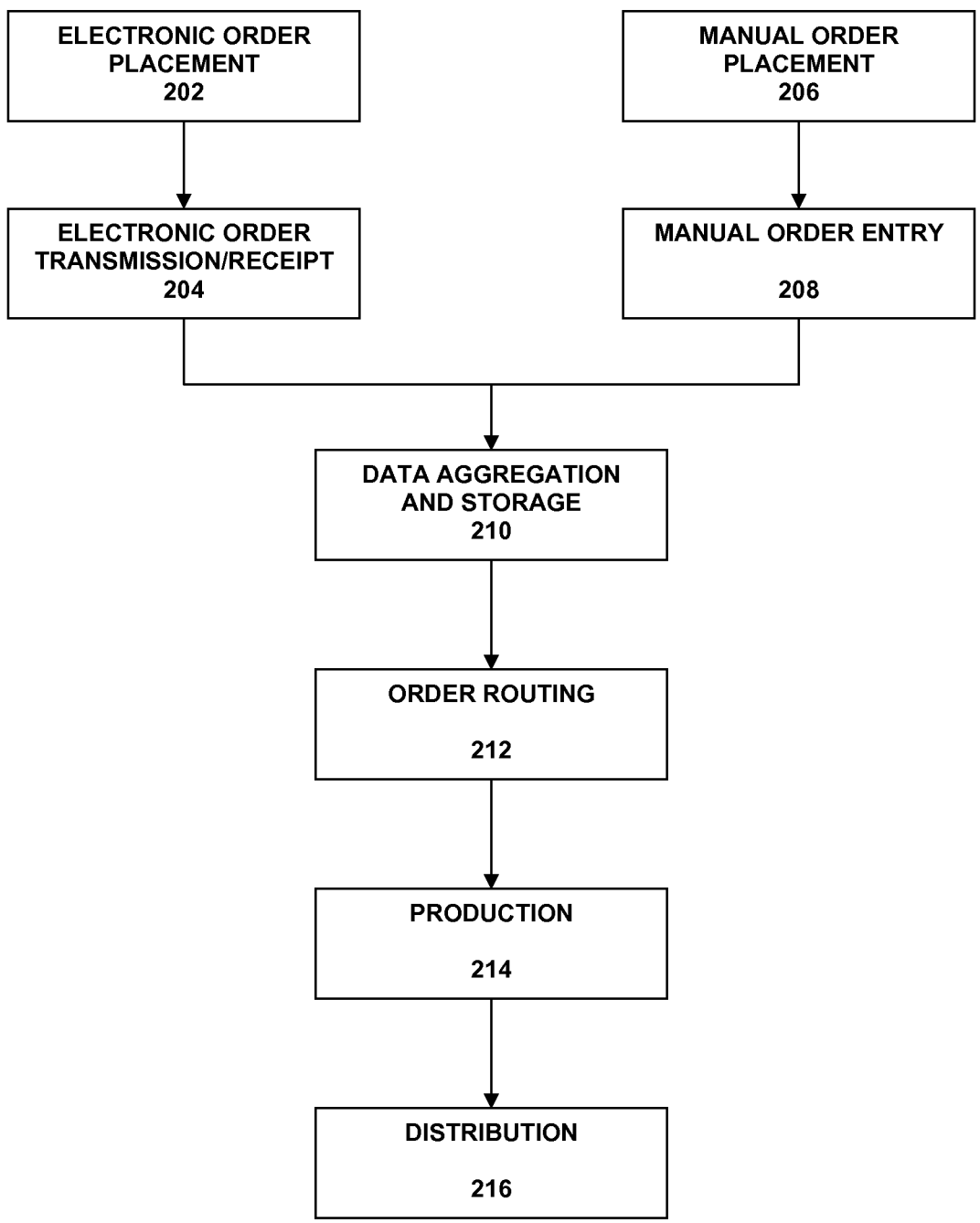
FIG. 4 is a flowchart according to one embodiment of the invention.

Data capture and management application 132 operating on server 130 is the primary link between and integrates operations of ordering subsystem 102, information management subsystem 104, and production/distribution subsystem 106. Data capture and management application 132, as well as the other applications of server 130 and subsystems of system 100 are more easily understood in the context of a particular example. Therefore, referring to FIG. 4, consumer 10 desires to place an order for a custom printed product to include individualized or personalized content, data, or information. The order could relate to a reprint or reorder of an existing product, an update of an existing product, or an entirely newly designed and selected product. In this example, consumer 10 places an order for business cards at step 202.

Figure 5:
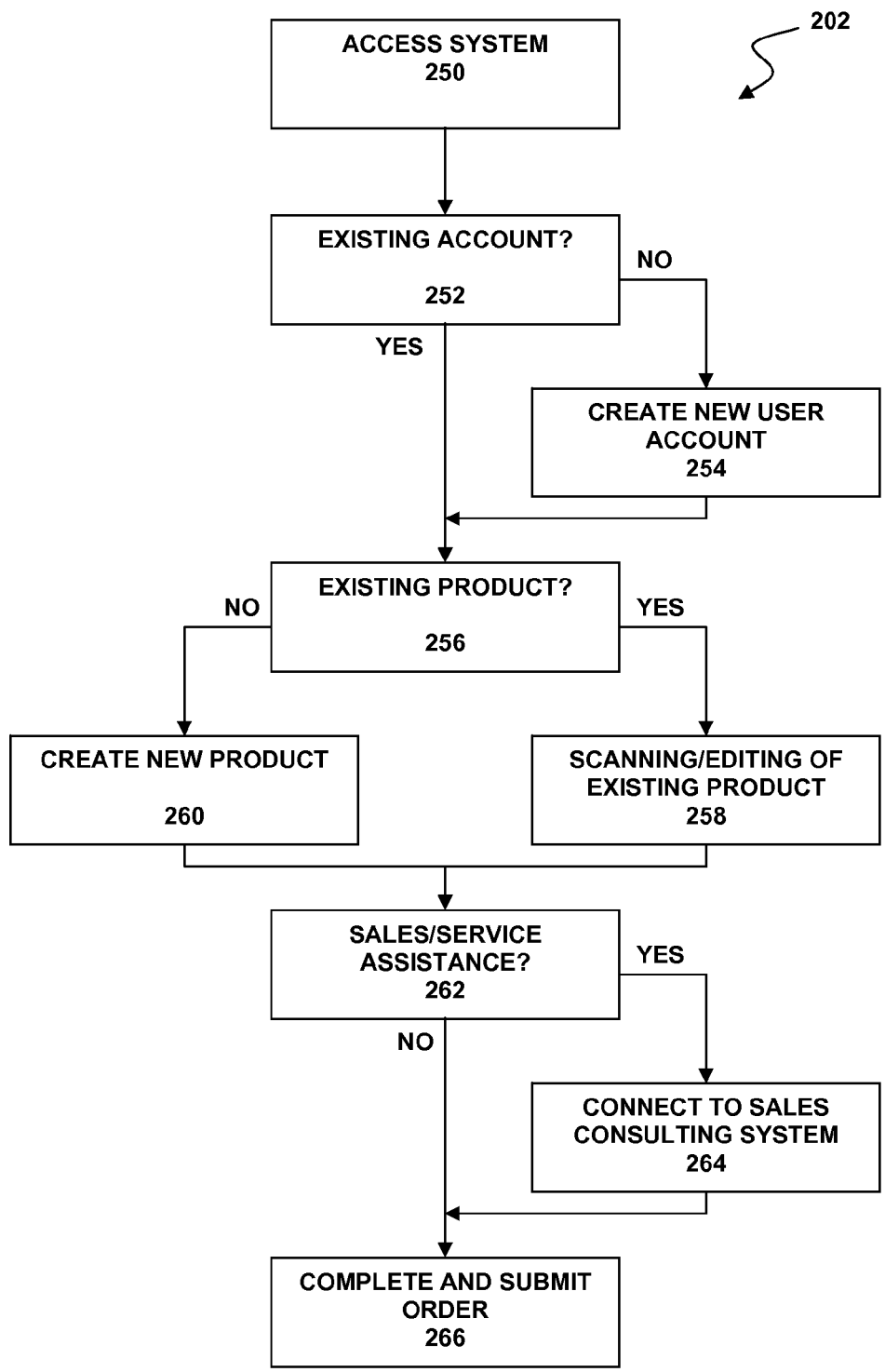
FIG. 5 is another flowchart according to one embodiment of the invention.

Electronic order placement step 202 is depicted in more detail in FIG. 5. As described above, consumer 10 can access user interface 108 of system 100 at step 250 in a variety of ways. In this example, access is gained at step 250 via kiosk 112 located at retailer/broker 20.

Formally accessing system 100 and certain features of user interface 108 can include logging in or selecting a guest user option in one embodiment. At or after a log-in prompt provided by user interface 108, system 100 determines whether the consumer has an existing account at step 252. Consumer 10 account information is stored on server 130, accessible by data capture and management application 132. An existing account may be a personal consumer account, a corporate account with one or more authorized users, a standalone system 100 account, an account integrated with one or both of digital asset management application 136 and digital content licensing application 138, or some other type of account. Available account types may be graduated or offer more advanced tools and features based on various criteria, and access can be complimentary on behalf of a retailer, commercial printing entity, or other organization, or can be offered as part of an incentive or provided as part of a subscription or other fee structure. In another embodiment, the scanning of step 256 which is described in more detail below, precedes steps 252-256 and triggers step 252 after scanning.

At step 254, system 100 creates a new user account for consumer 10 if no existing account exists. Account creation can comprise collecting basic consumer contact and, optionally, billing information and digital mark assets, logos, and other information. Consumer 10 can also select a user name and password to secure and streamline access to user interface 108 in the future. In another embodiment, account creation is carried out at a later stage, such as at step 266 when consumer 10 is completing an order.

Consumer 10 then has access to user interface 108 in order to place an order. In one embodiment, consumer 10 places an order from an existing printed product. For example, consumer 10 may have existing business cards that need to be reprinted to include updated contact information or to replenish supply. At step 256, system 100 via user interface 108 prompts consumer 10 to provide an existing product, if one exists. At step 258, consumer 10 can scan the existing product at scanner 116 to input information about and from the product into system 100 in one embodiment. To begin scanning, user interface 108 may first prompt the consumer for basic information about the product to be scanned. For example, consumer 10 can select a product type from a drop-down menu. Consumer 10 then inserts the business card or other existing paper product into scanner 116. The product is scanned and, by scanner 116 and/or CPU 118 in one embodiment, recreated in a digital file format, such as PDF, JPG, TIF, and other suitable and compatible file formats. An information extraction program operating on CPU 118, scanner 116, or on a local or remote server can then identify and parse the various data components and populate editable fields in user interface 108 with the appropriate data components. In another embodiment, scanning is omitted at step 258 and appropriate data components are instead received from a file or URL, such as is described in related U.S. application Ser. No. 11/242,603 entitled "SYSTEM AND METHOD FOR ELECTRONICALLY MANAGING INDIVIDUAL AND BUSINESS INFORMATION," filed Oct. 3, 2005, which has been incorporated herein by reference. In yet another embodiment, if scanner 116 is not available or not desired, the consumer can manually enter data from the existing paper product via user input means 122 or send a hardcopy form to retailer/broker 20 or printer/manufacturer 30 for scanning and data entry.

Following scanning, various applicable fields presented in the user interface can include first name, middle name/initial, last name, address, phone number 1, phone number 2, e-mail address, business or organization name, URL, digital mark asset, and the like. The fields can be populated with data obtained from the existing paper product or related digital file.

Following scanning or other entry at step 258 and at step 260, data capture and management application 132 is then triggered, hosted by server 130 in user interface 108. In addition to storing and managing account information and data, data capture and management application 132 facilitates editing and design of new and existing products to be custom printed with individualized information. As part of design and editing, consumer 10 can select layouts, fonts, colors, materials, effects, styles, and output types from options available for particular products.

In one embodiment, data capture and management application 132 is adapted to access and present an online catalog of custom printed products in user interface 108. The consumer can select existing layouts and designs, choose new products that complement existing individualized items, or begin an entirely new order, such as at step 260. The online catalog of custom printed goods can also be interactive and pre-populated. For example, consumer 10 scans an existing business card as described above or logs into their account via user interface 108. Based on data and metadata obtained from past orders, similar orders, or other sources, data capture and management application 132 can present consumer 10 with a catalog of preselected or generally available items digitally pre-populated with consumer 10 data in user interface 108. Letterhead matching the design of previously existing business cards can be shown with consumer 10's data in an example layout, or ceramic mugs can be shown with the logo previously printed on consumer 10's business cards. Consumer 10 can select, edit, and/or further customize the options displayed in the pre-populated catalog if so desired or request sales and service assistance for help.

Although sales and service assistance is depicted at steps 262 and 264 in FIG. 5, the consumer can access sales consulting component 110 at any time during step 202. Sales consulting component 110 provides trained, expert, and professional assistance to consumers via real-time interactive video and sound in one embodiment. An additional benefit to a commercial printing company is the opportunity to provide brand-familiar and trained representatives to assist consumers in making selections and composing orders. Further, a sales consultant with access to sales consulting component 110 can have direct access to production and other systems and subsystems of system 100 of the invention to provide additional information to consumers. In one embodiment, kiosk 112 or a similar system is replicated at a site of sales consulting component 110, which can be in virtually any physical location. For example, sales consulting component 110 can be local to any of a retailer/broker 20, printer/manufacturer 30, or third party site, such as a sales center, home office, corporate environment, or other location.

In one embodiment, the consumer accesses sales consulting component 110 by selecting an icon in user interface 108 at step 264. A video and/or textual dialog box can then open in user interface 108 to provide access both to a design page and live sales consulting assistance. The live sales consulting assistance is provided by a sales and service consultant located at a remote location in one embodiment. The remote location may be an office, residence, production facility, or other location properly outfitted with audio and video technology. The live assistance can comprise any or all of audio, video, and textual content at kiosk 112 and at the remote location. In one embodiment, however, video of the consumer at kiosk 112 is not provided in order to reduce the consumer's discomfort with appearing on camera. In another embodiment, the consumer can select whether to activate camera unit 120 at kiosk 112.

Figure 6:
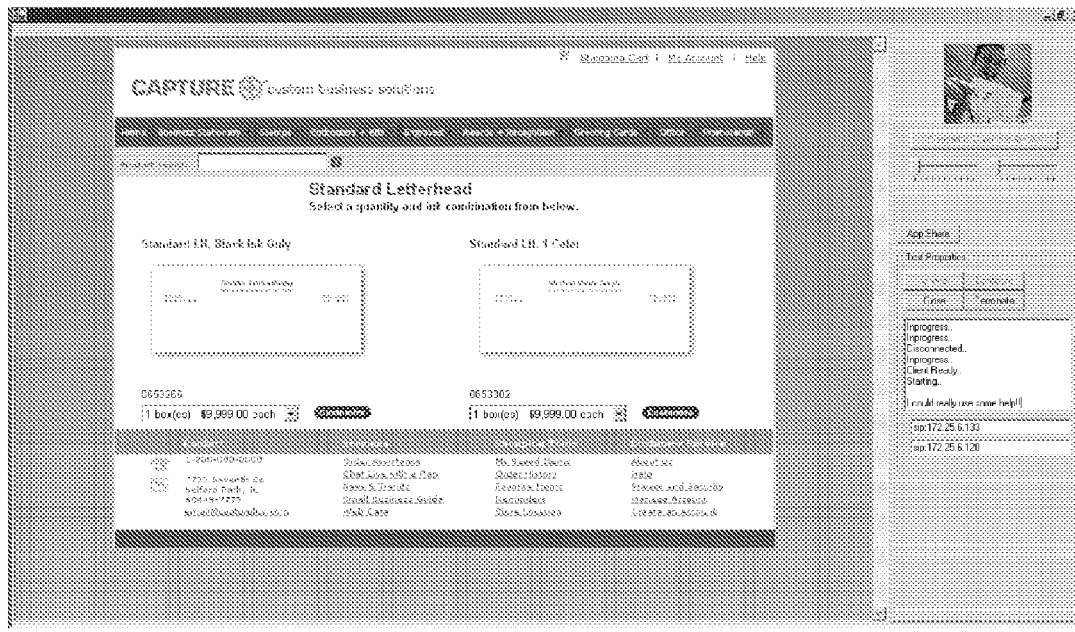
FIG. 6 is a consumer-side screenshot according to one embodiment of the invention.
Figure 7:
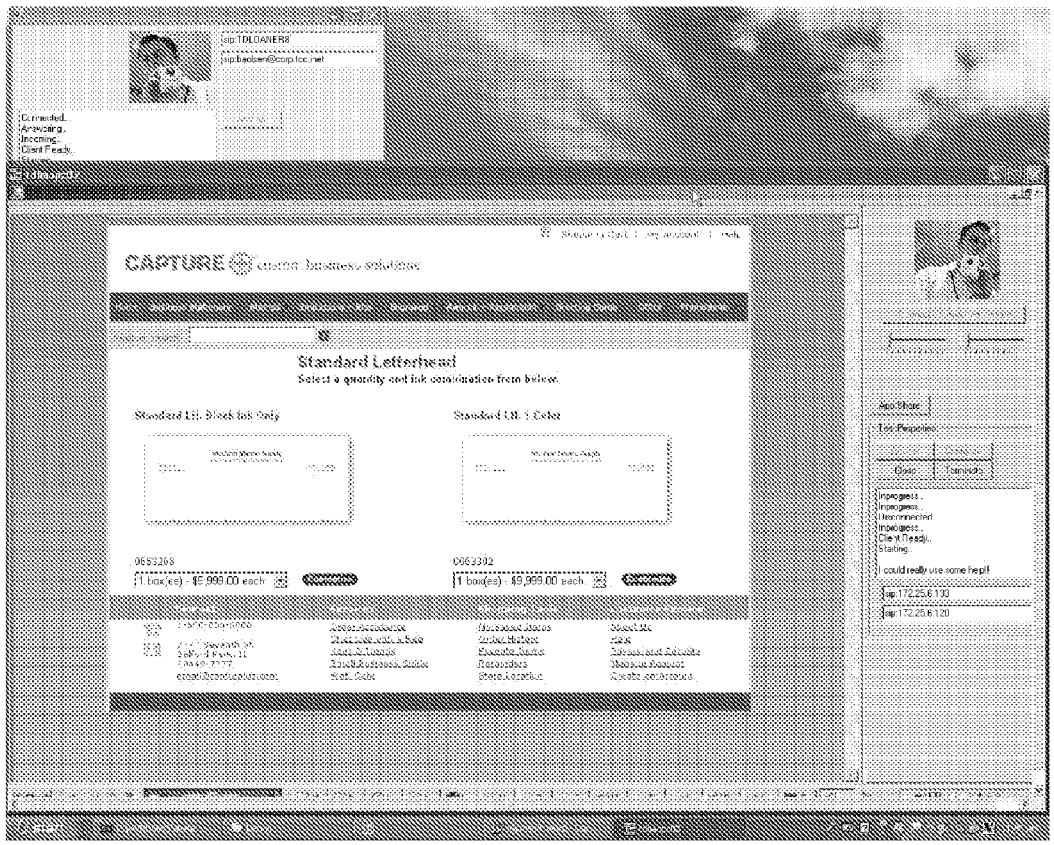
FIG. 7 is a sales-side screenshot according to one embodiment of the invention.

Proprietary software has been developed that provides shared-screen capabilities, enabling the sales and service consultant to locally view the same computer screen layout and information viewed by the consumer on screen 114 at kiosk 112. Example screenshots are depicted in FIGS. 6 (consumer side) and 7 (sales side). At any time, the consultant can take control remotely of the consumer's screen to make selections, identify options, or otherwise assist with the design and ordering process. In one embodiment, the assistance provided by sales and service consultants at step 264 results in higher order conversion, more efficient order placement, improved consumer satisfaction, reduced error rates, and increased order cross- and up-selling of complementary products and services. This integrated sales and service consulting feature of the present invention also reduces burdens on retailers by minimizing the time and expense required to train employees to assist with and accept orders for individualized products.

At step 266, the order is finalized by consumer 10. The sales and service consultant, if accessed, can further assist consumer 10 with these steps, or consumer 10 can complete them alone. Order completion step 266 includes reviewing a digital proof of the individualized product(s) created at step 202, entering account and contact information if not previously established, providing billing information, and submitting the order. In another embodiment, consumer 10 can request a hardcopy proof to verify printed ink colors, paper type, or other characteristics that cannot be or are difficult to proof on a digital screen. In yet another embodiment, kiosk 112 is equipped with printer 124 enabling consumer 10 to print a basic proof on-site without having to wait for one to be sent by mail or other means.

Returning to FIG. 4, the order completed at step 202 is transmitted to and received by server 130 at step 204. Referring to steps 206 and 208, system 100 is also adapted to handle orders placed manually according to traditional hardcopy, mail, facsimile, telephone, or other methodologies, although these methodologies are generally not preferred because they are time and information inefficient. Such orders are received at step 208 in hardcopy form and manually entered into system 100 by billing personnel and/or typesetters.

At step 210, order data and metadata are extracted, aggregated, and stored at server 130 by data capture and management application 132. In one embodiment, order data is used not only to produce the ordered product(s) but additionally, with order metadata, to pre-populate an online order catalog as described above, to provide targeted marketing and advertising to consumers, to provide additional consumer information to retailer/brokers 20 and printers/manufacturers 30 hosting kiosk 112 to enable retailer/brokers 20 to learn more about and therefore more effectively serve consumer 10, and to provide a general data set with which to gauge consumer habits and preferences to improve the products and services offered by and presented within system 100. In one embodiment, this data and metadata can be used by system 100 in real time to provide targeted advertising with an individual consumer's order and can be stored and updated for use during subsequent orders. Targeted advertising is described in more detail below.

Figure 8:
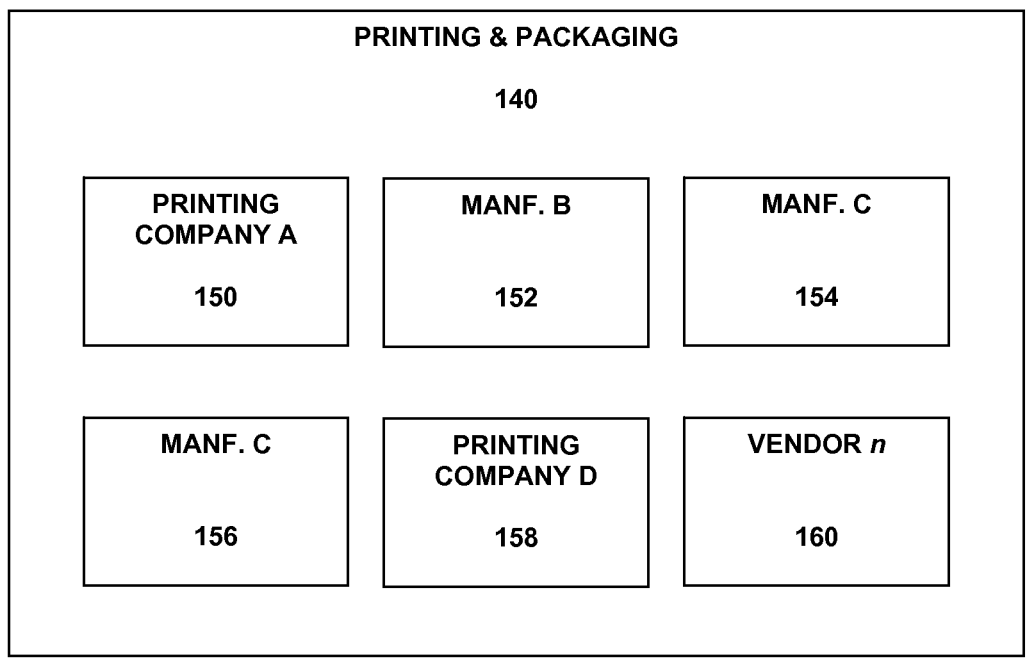
FIG. 8 is a block diagram of a printing and packaging subsystem according to one embodiment of the invention.

The order is then routed at step 212 to production/distribution subsystem 106, and orders and suborders are produced at step 214. Production/distribution subsystem 106 comprises a printing and packaging unit 140 and a distribution/tracking unit 142 in one embodiment. Printing and packaging unit 140 can comprise any type of printing or production compatible with one or more desired customized products. The particular production steps and processes vary according to the products produced. For example, a single order might include business cards, letterhead, T-shirts, and pens, each including similar but not identical individualized information, each to be produced by a different printer/manufacturer 30 or other vendor. Referring to FIG. 8, system 100, in particular data capture and management application 132, is adapted to automatically and digitally route orders and suborders appropriately among the various printing companies 150 and 158; manufacturers 152, 154, and 156; and other vendor(s) 160 that are part of or affiliated with printing and packaging subsystem 140. System 100 can also route orders according to priority or availability. For example, if two printing facilities 150 and 158 are equally capable of handling a printing order, system 100 can automatically route an order to a geographically convenient facility or to the facility currently providing the quickest turnaround. Order data and metadata can be helpful in determining geographic convenience. A geographically convenient facility could be one close to consumer 10's shipping address for faster handling or local to retailer/broker 20 if an order is to be picked up in person. Other factors may be used to determine geographic convenience and/or preferred printer manufacturer 30 for purposes of order routing among available vendors.

In one embodiment, printing and packaging unit 140 comprises one or more commercial grade printing systems, such as at one or more printing companies 150, 158. The printing systems of printing companies 150, 158 can comprise pre-printing stages, such as file receipt and preparation. In one embodiment, server 130 and data capture and management application 132 provide efficient data handling and information management by providing a centralized repository accessible by printing companies 150, 158 and other printers/manufactures 30. In combination with digital asset management application 136, server 130 further provides appropriately formatted and optimized files preferred or required by each printer/manufacturer 30 to produce the desired orders and suborders. In other embodiments, printing companies 150, 158 and other printers/manufacturers 30 receive files and perform necessary reformatting or optimization on-site.

The printing systems of printing companies 150, 158 and the other manufacturing systems of vendors 152, 154, 156, 160 and printers/manufacturers 30 in general, including printing/manufacturing/production stages and post-processing stages, such as assembly and packaging. Referring in particular to printing companies 150, 158, example printing methodologies include any form of gravure, waterless offset, direct image waterless offset, dry offset, lithographic, intaglio, embossing, engraving, screen, rotary screen, silkscreen, letterpress, ink jet, digital, thermal, lenticular and other dimensional printing techniques, and other related printing techniques or combinations thereof. Printing and packaging unit 140 can also comprise vendors 152, 154, 156, 160 and printers/manufacturers 30 in general that specialize in embroidery, stitching, heat, bonding, transferring, copying, and other specialized printing, manufacturing, production, and reproduction techniques.

Referring again to the business card order example, printing company 150 of printing and packaging unit 140 comprises a commercial grade printing press. The printing press can be continuous feed, capable of running both short and long runs with variable data, and can print business cards in variable imposition matrices, such in a 10×11 format, 2×50 format, and others. A run of 10×11 sheets, including optional advertising space of 10 cards, or more or fewer in other embodiments, can be printed in about two seconds in one embodiment. This printing speed is an improvement over existing systems used to print business cards.

Business cards can be printed on glossy, semi-glossy, or non-glossy paper stock, as appropriate to accommodate an acceptable or preferred level of ink absorption or some other printing characteristic. For example, certain paper stocks may be use in some applications because the stocks are sufficiently porous to enable the ink to absorb but not so porous so as to over-absorb the ink color and reduce the quality of the printed product. Other appropriate papers and materials can be used in other embodiments according to a desired product to be produced. For business cards, almost any stock of business card weight can be used. A variety of inks can also be used, including ink jet, dry toner, oil-based, water-based, and others.

For ease of integration and compatibility with other components of system 100, the printing press of printing and packaging unit 140 can be a digital press. The digital press can receive data to be printed in PDF files or in some other suitable or compatible file format. For example, certain presses require or prefer a particular file format, and the files provided in printing and packaging unit 140 can vary accordingly. As part of pre-printing in one embodiment, a file is received at a receiving unit of the press. In system 100, the file may be sent from server 130 and may be sent or requested, as mentioned above, in one of many available file formats. The print server then "rips" the file before the printing stage, in which the aforementioned quantities of cards can be printed from the data contained in the ripped file. Ripping, or raster image processing (RIP), includes hardware and/or software processing and converting of digital files to printable formats. The file can include data to print a single design or multiple designs with variable data, and a file is ripped for each different page to be printed. In other embodiments, multiple pages can be ripped in a single file. Multiple design files or single files including multiple designs can take longer to rip given the increased data. While the ripping process can take about ten minutes in one embodiment, which time-limits the printing process when only seconds are needed to actually print the images associated with the ripped file, further improvements have been made to reduce the time associated with ripping and transferring the files. For example, speed can be improved by downloading files on the fly during operation, which enables the press to run more continuously, needing to be stopped only periodically. The periodic stoppages can be timed, for example, to coincide with operator break times or routine service or maintenance for further improved efficiency. Additionally, speed can be improved by smaller file sizes, which result in faster file transfer times and shorter ripping times. Suitable printing presses of printing and packaging unit 140 include various ink jet and toner based systems, such as an Agfa-Gevaert Dotrix press, a Hewlett Packard Indigo press, a Kodak Nexpress, and a Xerox iGen press.

Printing and packing unit 140 can also comprise, such as for the printing of business cards, suitable post-printing processing and handling equipment. In one embodiment, printing and packaging unit 140 comprises one or more bi-directional slitter/collators for flat-printed business cards. A bidirectional slitter cuts large sheets of printed products into multiple individual products by first cutting in one direction, such as horizontally, and then cutting in a second direction, such as vertically. In another embodiment, printing and packing unit 140 comprises multiple printing lines feeding one or more slitting and cutting lines. Suitable cutting and slitting equipment is commercially available from such manufacturers as Duplo, Polar, and Rollem, among others. Other equipment can be used or may be more suitable in other embodiments in which different products, such as non-paper objects, are manufactured, individualized, customized, or personalized. Suitable post-processing can vary according to the particular product and can include coating, varnishing, sanding, heating, cooling, charging, discharging, curing, drying, polishing, painting, lacquering, gluing, pressing, sizing, punching, laminating, and other finishing processes, treatments, and methodologies.

In some embodiments, suitable preprocessing can also be performed. One preprocessing example includes applying magnetic stripes to paper phone cards. Such preprocessing can occur, for example, in the steps of unwinding, preprocessing, and rewinding a web. Roll-to-roll unwinding and rewinding can also be compatible with embodiments of the present invention, as well as sheet fed systems.

Following cutting and slitting, business cards can be collated and stacked. The particular cutting, slitting, and subsequent collating equipment and procedures can depend upon the particular product printed and the layout of the product on the original large sheet. For example, proper collating is of particular importance when printing sequential products on a single large sheet, such as pages of a book or numbered checks. Collating, in turn, is dependent upon the print layout or imposition matrix used for the large sheet(s) of printed materials.

Figure 9:
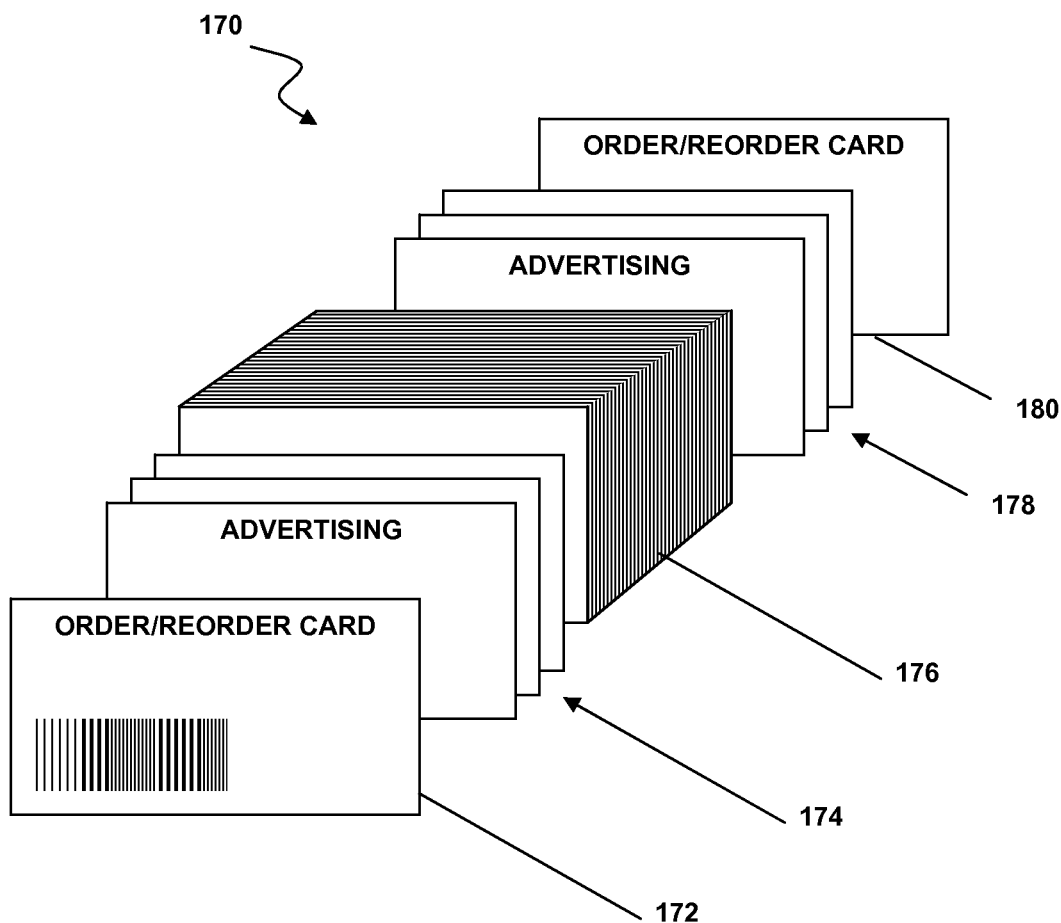
FIG. 9 is an exploded perspective view of a stack of custom printed business cards according to one embodiment of the invention.

In one embodiment of the present invention related to business cards, collating of items printed in variable imposition matrices is important in order to strategically place advertising, marketing, and reorder cards within a stack 170, as depicted in FIG. 9. For example, stack 170 can begin with an order summary or reorder card 172, followed by one or more optional advertising cards 174 before a main body 176 of cards, and end with one or more additional yet optional advertising cards 178 and an optional reorder card 180. In another embodiment, stack 170 can begin with order summary or reorder card 172, followed by main body 176, with one or more additional yet optional advertising cards 178 randomly placed within main body 176 and stack 170. In other embodiments, one or more advertising cards 174, 178 are additionally or alternatively placed in body 176 or otherwise strategically arranged throughout stack 170; more advertising cards 174, 178 may be placed toward the beginning of stack 170, as a consumer is more likely to see cards so placed in a timely manner or before needing to reorder to update changed information.

The advertising and marketing presented by cards 174 and 178 or by other means with other printed and manufactured items and products can provide targeted and controlled advertising and marketing. Cards 174 and 178 can also provide contact, service, consulting or other similar information related to the product ordered, consumer 10, or some other factor as described in more detail below. Advertising, marketing, contact, service, consulting, or other similar information can be generally referred to as promotional information. The promotional information can be targeted based on a number of factors related in particular to the consumer or the retailer/broker in one embodiment, and the aspect of control can relate to any or all of the message, placement, provider and recipient.

To facilitate these features, information management subsystem 104 comprises interactive advertising and marketing portion 134. Interactive advertising and marketing portion 134 is at least partially integrated with data capture and management portion 132 operating on server 130 in one embodiment to facilitate efficient information storage, transfer, and use, and to support interoperability and functionality when and where applicable. In other embodiments, interactive advertising and marketing portion 134 is distinct from one or both of server 130 and data capture and management portion 132.

When operating in conjunction with data capture and management portion 132, interactive advertising and marketing portion 134 can use consumer 10 and order data and metadata to select advertising or other promotional information to appear on advertising cards 174, 178. For example, consumer 10 places an order for business cards. The cards include consumer 10's name and title, such as "John Smith, Electrician," and address, including ZIP code 12345. While many printing companies view order information as a simple collective image, the present invention recognizes the data and metadata supplied in order to facilitate advertising and other features. Interactive advertising and marketing portion 134 can use this information to search an information database that includes available advertisers and other information. Interactive advertising and marketing portion 134 therefore may choose to include advertisements, offers, or other promotional information from electrical supply companies located in or near ZIP code 12345 on advertising cards 174 and 178.

Additionally or alternatively, cards 174 and 178 may be printed with coupons from restaurants in ZIP code 12345 offering specials or information from advertisers who have listed "electricians" as a selected or favored group. Further, ads can be personalized, such as, "Mr. Smith, did you know we opened a new store within five miles of your office?" or "John, please use this coupon to receive a complimentary car wash the next time you purchase five gallons of gas at our location on Elm Street."

Advertising cards 174 and 178 can also be printed with advertisements or promotional offers from retailer/broker 20 where consumer 10 placed the order. Further, retailer/broker 20 can provide, edit, and select which advertisements or promotional offers will appear on advertising cards 174 and 178 via a retailer/broker 20 portion of user interface 108. Retailer/broker portion of user interface 108 can be accessed via a retailer/broker 20 version of kiosk 112, via the Internet, or by some other means. In one embodiment, retailer/broker portion 550 enables real-time selection and editing of ads and other promotional information provided to consumer 10. Retailer/broker 20 can set up various rules in interactive advertising and marketing portion 134 via user interface 108 by which advertising is placed. Dynamic editing of promotional information and placement is also enabled. For example, retailer/broker 20 can select each morning which promotional information will run for orders placed or produced that day. Separate rules can also be formulated based on product type ordered, order size or frequency, consumer address or title, or some other criteria. Retailer/broker 20 can also choose to omit advertisements from some or all orders. Individual advertisers can be arranged by retailer/broker 20, printer/manufacturer 30, or some other party. In some embodiments, printer/manufacturer 30 can also edit and select some or all of the advertisements placed in an order.

Variable imposition matrices and cutting/collating can be used when targeted advertising is to be placed in a business card stack 170, as the layout and arrangement of these matrices assist in proper order arrangement. For example, the promotional information to be included in an order originating from a first big box office supply store retailer/broker 20 must not be intermixed with the advertising to be placed in an order originating from a competitor second big box office supply store retailer/broker 20. Cutters/slitters and collators used in cooperation with the aforementioned variable imposition matrices of the present invention place advertising cards 174 and 178 where desired in card stack 170.

The targeted or personalized promotional information can be distinguished from existing co-marketing or co-advertising. For example, advertisements for coordinating check book covers are often included in personal check orders. While these advertisements are targeted with respect to the product, they are not selected based on customer data or order metadata related to a wider range of criteria. Further, their placement and inclusion in particular orders cannot be omitted, selected on the fly, or otherwise easily determined via a third-party retailer/broker 20.

Referring again to FIG. 4, packaging methodologies at step 214 can improve distribution in one embodiment by reducing handling and labeling. For example, in further post-processing of business cards, the stacks are packaged for distribution. Suitable packaging equipment is commercially available from Unisource and other manufacturers. In one embodiment, packaging lines can package products both from the aforementioned preferred digital press as well as from traditional printing/manufacturing processes. For example, a plurality of printing lines may produce products according to various processes, and the products are subsequently packaged via a single system, or multiple packaging system may be used according to the volume produced by a single printing line. Other packaging formats can be used for business cards and other items produced by system 100. Once packaged, the printed products are distributed at step 216 by distribution/tracking unit 142 directly to consumer 10 or to a recipient specified by consumer 10 during ordering.

Expedited packaging and distribution is provided in one embodiment by the modular blister packs described in more detail in pending U.S. application Ser. No. 11/301,501 entitled "PACKAGING, STORING AND DISPENSING SYSTEM FOR PRINTED MATERIALS," filed Dec. 13, 2005, which has been incorporated herein by reference. The invention described in U.S. application Ser. No. 11/301,501 gives users of business cards or other printed units access to bulk numbers of business cards stored in modular separable packets or modules. The modular separable packets are substantially sealed from the environment and protect the cards therein from wear and soiling until the cards are dispensed. The modular separable packets are structured to allow individual dispensing of the business cards while still providing substantial protection to the remaining business cards in the packet. The modular packets allow users to transport and store business cards in relatively small quantities, while still maintaining the cards in excellent condition and accommodating individual dispensing of the cards. The modules can comprise blister pack packaging adapted to store approximately fifty to one hundred business cards in modularized packages. The modularized packages are positioned together in groups, with each modularized package individually separable from the group. A tear away strip on each modularized package can be selectively removed to provide for the dispensing of individual cards from the modularized package. The modularized packets can also be automatically packaged to include an external shipping address for improved handling.

After an order has been received, there are several different account management tools which can be used depending upon the user. In one embodiment, consumer 10 can access their account information to view and approve order proofs, order status, shipping status, billing status or place new orders. In another embodiment of account management tools, retail/broker 20 can pull up the account information by a variety of categories, such as orders by geography, i.e., how many orders were placed at kiosks 112 for a particular metropolitan area, or how many orders per location, or by product, such as how many business card orders, how many color business card orders, how many mug orders, how many pen orders, and the like. Retail/broker 20 can use this account management tool to get up-to-date billing information and statistics, such as how many total dollars were spent, how much revenue was generated, and how much the consumer or store was billed. Additionally, retail/broker 20 can view production status, when a product was produced or shipped, what particular tracking number was assigned for a shipment, what a projected delivery date and time is, and the like. Retail/broker 20 can also see if consumer has viewed and/or approved a proof and can view a consumer's order history, store order history, or regional order history.

In another embodiment of the account management tools, retailer/broker 20 and/or printer/manufacturer 30 can view and extract billing information so that credit cards, gift cards, and coupons are properly billed and redeemed. Verified proofs and order histories can also be viewed. In yet another embodiment, retailer/broker 20, printer/manufacturer 30, and/or personnel at sales consulting subsystem 110 can also view account information to verify orders, verify order status, view shipping status, view and report tracking numbers, and project possible arrival times of the products and/or goods. This account summary can be part of data capture and management application 132 and can provide order tracking, order history, reordering, pre-populated catalog access, and other custom features of use to consumer 10. The account summary can also provide notifications of new products, specials, sales, and other offers and remind consumer 10 that it may be time to reorder a previously ordered product. For example, data capture and management application 132 can track that a particular consumer 10 orders 500 business cards every eight months. At a time seven months from the last order, data capture and management application 132, via account summary 600, can prompt consumer 10 with a reorder reminder. These and other features may also be integrated with the invention described in copending U.S. application Ser. No. 11/242,603 entitled "SYSTEM AND METHOD FOR ELECTRONICALLY MANAGING INDIVIDUAL AND BUSINESS INFORMATION," filed Oct. 3, 2005, which has been incorporated herein by reference.

Further, with the customer data described above, retailer/broker 20 can send out targeted email with direct links back to a consumer's account to advertise any number of customizable products from the retail solution catalog. When consumer 10 opens up that link to the document, consumer 10 is directed to their account page where they can view an image of the advertised product as it might appear with some of their data, marks, or information appearing on the advertised product. Consumer 10 can order advertised products by selecting an option, or consumer 10 can further edit advertised products before ordering. The timing of these targeted emails can vary. For example, email messages can be sent to consumers 10 who created an account and customized products at kiosk 112 but did not complete an order, or messages can be sent as a follow-up or reminder regarding a reorder. Email messages can also be sent on-demand by retailer/broker 20 and/or printer/manufacturer 30.

A retailer/broker 20 portion of the aforementioned account management feature can be integrated with interactive advertising and marketing portion 134 or some other part of server 130 in one embodiment. Via this user interface portion, retailer/broker 20 can view overall orders placed at a location and obtain additional information regarding use, demographics, and other characteristics for performance, evaluative, advertising, marketing, reporting, statistical, price determination, promotional, and other purposes.

One or more of data capture and management application 132, interactive advertising and marketing application 134, digital asset management application 136, and digital content licensing application 138 can also support a logo, graphic, or design self-creation or assistance service. This service can be provided as an add-on or can be fully integrated with some other portion of system 100. In one embodiment, data capture and management application 132, digital asset management application 136, interactive advertising and marketing application 136, and digital content licensing toolbar application 138 can operate one a single server or on one or more communicatively coupled servers. Databases accessed, used, or hosted by any or all of applications 132, 134, 136, and 138 can be shared, independent, and/or support data replication where needed or desired. It follows that data can be stored separately or housed centrally, with servers capable of extracting and/or pushing data if or when necessary. Virtually any operational and data configurations capable of supporting the various applications can be used in various embodiments of the invention, including web, matrix, hub and spoke, and others.

Referring again to FIG. 2, digital asset management application 136 is described in more detail in U.S. Provisional Application No. 60/751,040 entitled "DIGITAL MARK ASSET MANAGEMENT SYSTEM AND METHOD," filed Dec. 15, 2005, which has been incorporated herein by reference. Briefly, digital asset management application 136 provides improved content holder control and monitoring of digital mark use, robust and intelligent formatting and optimization of digital mark files for particular uses, and standardization of the appearance of marks such as logos and insignia regardless of application in a convenient, efficient, and quality-conscious manner. In particular, one embodiment of the present invention is directed to systems and methods for managing digital mark assets including digital mark asset acquisition/capture, digital mark asset storage and security, digital mark asset refinement and enhancement including file format and content optimization, and digital mark data security and regulated/controlled and monitored data distribution. Digital asset management application 136 provides a service through which digital mark assets can be managed, stored, optimized, distributed, and reproduced. Digital asset production and reproduction can be optimized by the system of the invention across a plurality of platforms, including print, embroidery, silk screen, stamp, web publishing, and others, user and vendor systems, and end products to provide consistent and repeatable quality regardless of format or media. The system provides enhanced management and control tools to digital content owners while maximizing content applications and flexibility in a secure environment. The system also provides information regarding digital mark asset access, use, distribution, and reproduction that may be of use to content owners, vendors, system managers, and other third parties. As such, digital asset management application 136 is particularly suited for use within, for example, system 100 to manage, store, optimize, distribute, and reproduce digital marks provided or owned by users desiring to reproduce the marks as part of customized printed content. For example, corporate logos and graphics are frequently used in various forms on business cards, apparel, and other individualized, customized, or personalized products. Digital asset management application 136 as part of system 100 provides approved content optimized for the particular application requested by a user.

Digital content licensing application 138 is described in more detail in pending U.S. application Ser. No. 10/942,747 entitled "DIGITAL CONTENT LICENSING TOOLBAR," filed Sep. 16, 2004, which has been incorporated herein by reference. Briefly, digital content licensing application 138 manages online transactions of copyrighted material and may be embodied as a toolbar that displays copyright status information available at kiosk 112. More particularly, the toolbar can be integrated with an Internet browser at kiosk 112. Digital content licensing application 138 comprises a number of features, including controlling content management information and certain transactional features associated with obtaining content, in one embodiment. In one example, digital content licensing application 138 is used to track sales and distribution of formerly printed (i.e., hardcopy) content as digital content in an electronic environment, such as the Internet. Within system 100, digital content licensing application 138 can be of use tracking use of licensable graphics, text, video, broadcasts, and characters that a user may desire to reproduce digitally and/or on customized printed materials. Users of digital content licensing application 138, as with users of system 100 generally, can include corporate enterprise clients with a plurality of authorized individual users who access, distribute, or otherwise utilize digital content such as printed articles, graphics, clip art and other media, audio-visual transmission, and the like on behalf of the enterprise. Therefore, digital content licensing application 138 in combination with digital asset management application 136 can form an effective corporate asset and use management system. Users may also include individual end users accessing content for personal use, including home printing/publishing of occasion cards, invitations, announcements, business cards and correspondence, and other items. Users may also be individuals desiring to obtain a digital copy of a broadcast sporting event or television show for viewing. Accordingly, a number of industry-specific applications digital content licensing application 138 can exist, i.e., enterprise use of Internet-available copyrighted information; occasion printing, which could encompass home publishing as well as use by retail/special order printers.

The invention therefore addresses and resolves many of the deficiencies and drawbacks previously identified. The invention may be embodied in other specific forms without departing from the essential attributes thereof; therefore, the illustrated embodiments should be considered in all respects as illustrative and not restrictive.

The invention claimed is:

1. A method of printing a set of business cards comprising:
   receiving an order for customized products, wherein the order comprises order data and at least a portion of the order comprises a set of business cards;
   storing the order data in a database;
   correlating at least a portion of an address of the stored order data with data in an information database;
   extracting information from the order data to be printed on the business cards;
   printing the set of business cards, wherein the set of business cards comprises at least one summary card comprising at least a portion of the order data, a plurality of business cards comprising individualized information selected from the stored order data, and at least one promotional card comprising targeted information selected from the information database based at least in part on the correlating; and
   assembling the set of business cards into a business card stack by strategically arranging the at least one summary card and the at least one promotional card relative to the plurality of business cards.

2. The method of claim 1, further comprising electronically transmitting the order prior to the receiving.

3. The method of claim 1, further comprising manually entering at least a portion of the order data from a hardcopy order form.

4. The method of claim 1, wherein the correlating further comprises:
   matching at least one element of the stored order data with at least one corresponding element in the information database, wherein the at least one element is selected from the group consisting of a job title; a business name; a business type; an address; a ZIP code; a telephone; an order origination location; an order placement date; an order production date; a new order status; a reorder status; an order composition; and an order size; and
   selecting the targeted information from the information database based on the at least one corresponding element, wherein the targeted information comprises at least one of promotional information and a promotional offer.

5. The method of claim 1, wherein strategically arranging further comprises randomly placing the at least one promotional card within the business card stack.

6. The method of claim 1, further comprising assembling the business card stack in the following order: a summary card; at least one promotional card; a plurality of identical business cards; at least one promotional card; and a summary card.

7. The method of claim 1, further comprising overriding the correlating by manually selecting the targeted information.

8. The method of claim 7, wherein the overriding further comprises manually selecting the targeted information at an order origination location.

9. The method of claim 7, wherein the overriding further comprises manually selecting the targeted information at an order production location.

10. A method of printing a set of business cards comprising:
    receiving, by an order receiving computer system, an order for a set of business cards, the order comprising order data;
    storing the order data in an order data database;
    correlating at least a portion of an address of the stored order data with data in an advertising and marketing database to identify targeted information data;
    extracting order summary information data and individualized information data from the stored order data;
    providing the order summary information data, the individualized information data and the targeted information data to a printing system;
    printing the set of business cards comprising at least one summary card with the order summary information data, a plurality of business cards with the extracted individualized information data, and at least one promotional card based on the targeted information data; and
    assembling the set of business cards into a business card stack by strategically arranging the at least one summary card and the at least one promotional card relative to the plurality of business cards.

11. The method of claim 10, wherein the correlating further comprises:
    correlating at least one element of the stored order data with the data in an advertising and marketing database, wherein the at least one element is selected from the group consisting of a job title; a business name; a business type; an address; a ZIP code; a telephone; an order origination location; an order placement date; an order production date; a new order status; a reorder status; an order composition; and an order size; and
    identifying the targeted information based on the at least one element, wherein the targeted information comprises at least one of promotional information or a promotional offer.

12. The method of claim 10, wherein the strategically arranging comprises randomly placing the at least one promotional card within the business card stack.

13. The method of claim 10, wherein the assembling further comprises arranging the set of business cards into the business card stack in the following order: a summary card; at least one promotional card; a plurality of business cards; at least one promotional card; and a summary card.

14. A method of printing a set of customized products comprising:
    receiving an order for customized products, wherein the order comprises order data and at least a portion of the order comprises a set of customized products;

storing the order data in a database;

correlating at least a portion of an address of the stored order data with data in an information database;

extracting information from the order data to be printed on the customized products;

printing the set of customized products, wherein the set of customized products comprises at least one summary item comprising at least a portion of the order data, a plurality of customized products comprising individualized information selected from the stored order data, and at least one promotional item comprising targeted information selected from the information database based at least in part on the correlating; and assembling the set of customized products by selectively arranging the at least one summary item and the at least one promotional item relative to the plurality of customized products.

15. The method of claim 14, wherein the customized products comprise labels.

16. The method of claim 15, wherein the customized products comprise business cards.

* * * * *